United States Patent
Sharma et al.

(10) Patent No.: US 6,738,743 B2
(45) Date of Patent: May 18, 2004

(54) UNIFIED CLIENT-SERVER DISTRIBUTED ARCHITECTURES FOR SPOKEN DIALOGUE SYSTEMS

(75) Inventors: Sangita R. Sharma, Hillsboro, OR (US); Jim A. Larson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 522 days.

(21) Appl. No.: 09/819,832

(22) Filed: Mar. 28, 2001

(65) Prior Publication Data

US 2002/0143551 A1 Oct. 3, 2002

(51) Int. Cl.$^7$ ................................ G10L 21/00
(52) U.S. Cl. .............. 704/270.1; 704/270; 709/226
(58) Field of Search ................ 704/270, 270.1; 709/218, 224, 226, 249, 229

(56) References Cited

U.S. PATENT DOCUMENTS

| | | | |
|---|---|---|---|
| 6,044,343 A | 3/2000 | Cong et al. | 704/236 |
| 6,275,806 B1 * | 8/2001 | Pertrushin | 702/272 |
| 6,343,313 B1 * | 1/2002 | Salesky et al. | 709/204 |
| 6,427,132 B1 * | 7/2002 | Bowman-Amuah | 703/22 |

* cited by examiner

Primary Examiner—Susan McFadden
(74) Attorney, Agent, or Firm—Blakely, Sokoloff, Taylor & Zafman LLP

(57) ABSTRACT

The invention relates to unified client-server distributed architectures for spoken dialogue systems. Particularly, the invention provides a method, apparatus, and system for dynamically switching between various architectural configurations based upon user functionality and network conditions to implement speech recognition functions for a spoken dialogue system. In one embodiment, a client device is coupled to a server through a network. A configuration selection switch located within the client device selects a configuration based upon user functionality and network conditions to implement speech recognition functions for the spoken dialogue system. For example, the configuration selection switch may select one of a client-based configuration, a server-based configuration, a client-server distributed configuration, or a client-gateway-server distributed configuration based upon user functionality and network conditions. Each of these configurations is selected to provide the user with the most efficient speech recognition for the function being utilized by the user based upon network conditions.

31 Claims, 7 Drawing Sheets

UNIFIED CLIENT-SERVER DISTRIBUTED ARCHITECTURES FOR SPOKEN DIALOGUE SYSTEMS

BACKGROUND

1. Field of the Invention

This invention relates to spoken dialogue systems. In particular, the invention relates to unified client-server distributed architectures for spoken dialogue systems.

2. Description of Related Art

Today, speech is emerging as the natural modality for human-computer interaction. Individuals can now talk to computers via spoken dialogue systems that utilize speech recognition. Although human-computer interaction by voice is available today, a whole new range of information/communication services will soon be available for use by the public utilizing spoken dialogue systems. For example, individuals will soon be able to talk to a hand-held computing device to check e-mail, perform banking transactions, make airline reservations, look up information from a database, and perform a myriad of other functions.

Speech recognition entails machine conversion of sounds, created by natural human speech, into a machine-recognizable representation indicative of the word or the words actually spoken. Typically, sounds are converted to a speech signal, such as a digital electrical signal, which a computer then processes. Most currently commercially-available speech recognition systems include computer programs that process a speech signal using statistical models of speech signals generated from a database of different spoken words. Typically, these speech recognition systems are based on principles of statistical pattern recognition and generally employ an acoustic model and a language model to decode an input sequence of observations (e.g. acoustic signals) representing input speech (e.g. a word, string of words, or sentence) to determine the most probable word, word sequence, or sentence given the input sequence of observations. Thus, typical modern speech recognition systems search through potential words, word sequences, or sentences and choose the word, word sequence, or sentence that has the highest probability of re-creating the input speech. Moreover, speech recognition systems can be speaker-dependent systems (i.e. a system trained to the characteristics of a specific user's voice) or speaker-independent systems (i.e. a system useable by any person).

Further, there are different types of speech or voice recognition applications. For example, command and control applications typically have a small vocabulary and are used to direct the computer to perform specific tasks. An example of a command and control application would be to direct a computer to look up the address of a business associate stored in memory. On the other hand, natural language processing applications typically have a large vocabulary and the computer analyzes the spoken words to try and determine what the user wants and then performs the desired task. For example, a user may ask the computer to book a flight from Boston to Portland and the computer will determine that the user wants to make an airline reservation for a flight departing from Boston and arriving at Portland and the computer will then perform the transaction to make the reservation for the user.

Unfortunately, existing spoken dialogue systems are typically based on only one of three different types of standard architectures: client-only, server-only, or a client-server architecture. Although each of these types of architectures has certain advantages, each of these architectures also has some disadvantages.

BRIEF DESCRIPTION OF THE DRAWINGS

The features and advantages of the present invention will become apparent from the following description of the present invention in which.

DESCRIPTION

The invention relates to unified client-server distributed architectures for spoken dialogue systems. Particularly, the invention provides a method, apparatus, and system for dynamically switching between various architectural configurations based upon user functionality and network conditions to implement speech recognition functions for a spoken dialogue system.

In one embodiment of the invention, a client device is coupled to a server. The client device is typically coupled to the server through a network. A configuration selection switch can be located within the client device. The configuration selection switch selects a configuration based upon user functionality and network conditions to implement speech recognition functions for the spoken dialogue system.

For example, in one embodiment, the configuration selection switch may select one of a client-based configuration, a server-based configuration, a client-server distributed configuration, or a client-gateway-server distributed configuration based upon user functionality and network conditions. Each of these configurations is selected to provide the user with the most efficient speech recognition for the function being utilized by the user based upon network conditions. This results in a spoken dialogue system that makes the best use of available resources and provides a better user experience due to the range and availability of applications that can be automatically and efficiently accessed for the user by the configurations of the invention. Thus, according to one embodiment, the invention unifies these various configurations in one system to make maximum use of their advantages.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, types of data, protocols, procedures, components, networking equipment, speech recognition components, electrical structures and circuits, are not described in detail, or are shown in block diagram form, in order not to obscure the present invention. Furthermore, aspects of the invention will be described in particular embodiments but may be implemented in hardware, software, firmware, middleware, or a combination thereof.

Figure 1:
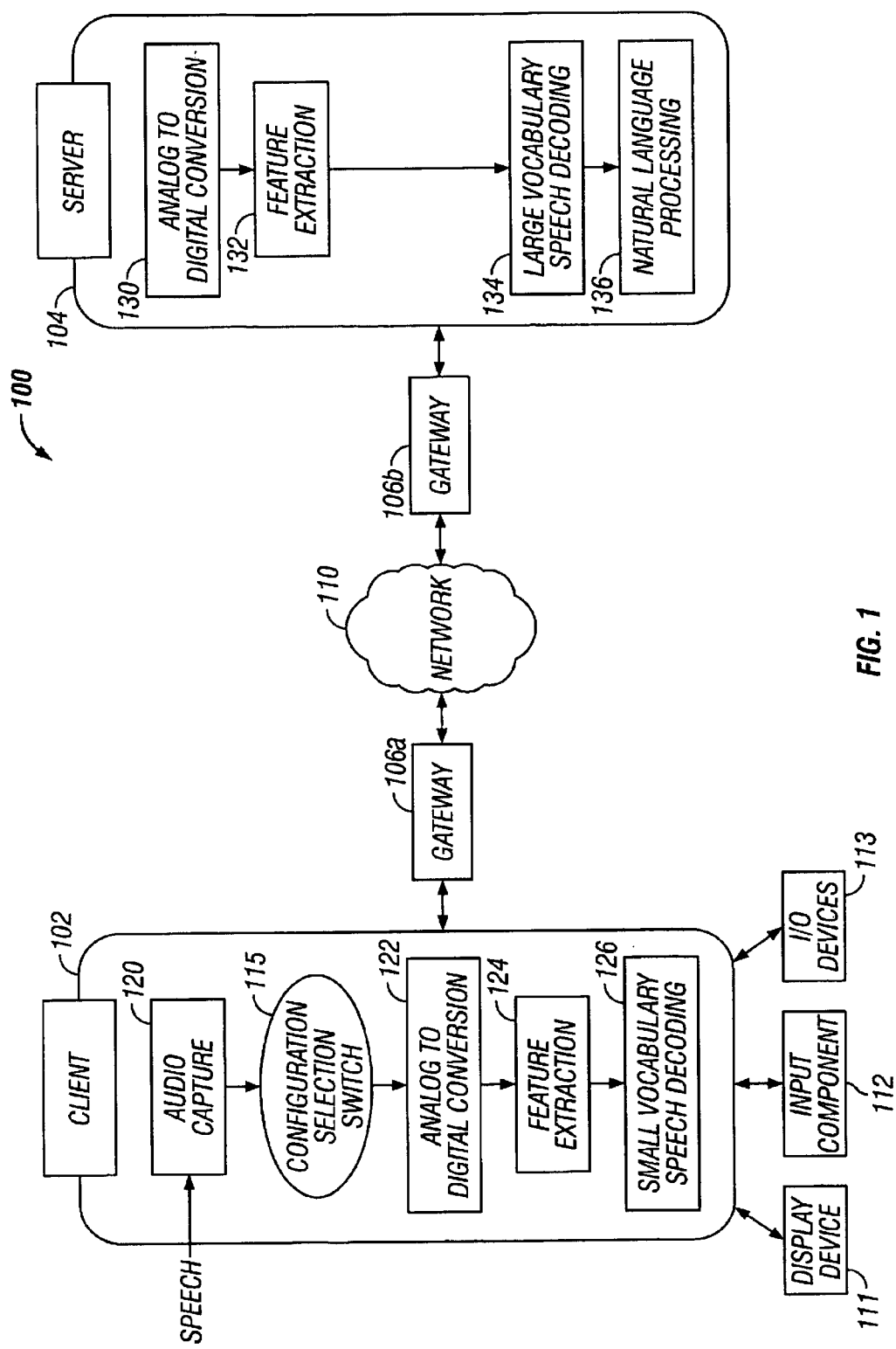
FIG. 1 is a block diagram illustrating an exemplary environment of a spoken dialogue system in which an embodiment of the invention can be practiced.

FIG. 1 is a block diagram illustrating an exemplary environment 100 for a spoken dialogue system in which an embodiment of the invention can be practiced. As shown in the exemplary environment 100, a client computing device 102 can be coupled to a server 104 through a link, or more particularly, a network 110. Generally, the environment 100 is a voice and data communications system capable of transmitting voice and audio, data, multimedia (e.g. a combination of audio and video), Web pages, video, or generally any sort of data.

The client computing device 102 can include cell-phones and other mobile computers (e.g. personal digital assistant (PDA), a wearable computer, a wireless handset, a Palm Pilot, etc.), or any other sort of mobile device capable of processing data. However, it should be appreciated that the client device 102 can be any sort of telecommunication device or computer system (e.g. personal computer (laptop/desktop), network computer, server computer, or any other type of computer).

As is illustrated in FIG. 1, the client computing device 102 is bi-directionally coupled to a server 104 via a link. A "link" is broadly defined as a communication network formed by one or more transport mediums. The client device 102 can communicate with the server 104 via a link utilizing one or more of a cellular phone system, the plain old telephone system (POTS), cable, Digital Subscriber Line, Integrated Services Digital Network, satellite connection, computer network (e.g. a wide area network (WAN), the Internet, or a local area network (LAN), etc.), or generally any sort of private or public telecommunication system, and combinations thereof. Examples of a transport medium include, but are not limited or restricted to electrical wire, optical fiber, cable including twisted pair, or wireless channels (e.g. radio frequency (RF), terrestrial, satellite, or any other wireless signaling methodology). In particular, the link may include a network 110 along with gateways 106a and 106b.

The gateways 106a and 106b are used to packetize information received for transmission across the network 110. A gateway 106 is a device for connecting multiple networks and devices that use different protocols. Voice and data information may be provided to a gateway 106 from a number of different sources and in a variety of digital formats. The gateway 106b that connects to the server 104 may also include specialized voice processing functionalities (for e.g., a Dialogic board) that optimize the connection to the server that provides speech recognition functionality.

The network 110 is typically a computer network (e.g. a wide area network (WAN), the Internet, or a local area network (LAN), etc.), which is a packetized or a packet switched network that can utilize Internet Protocol (IP), Asynchronous Transfer Mode (ATM), Frame Relay (FR), Point-to-Point Protocol (PPP), Voice over Internet Protocol (VoIP), or any other sort of data protocol. The computer network 110 allows the communication of data traffic, e.g. voice/speech data and other types of data, between the client device 102 and the server 104 using packets. Data traffic through the network 110 may be of any type including voice, audio, graphics, video, e-mail, Fax, text, multi-media, documents and other generic forms of data. The computer network 110 is typically a data network that may contain switching or routing equipment designed to transfer digital data traffic. In a packet switched network, at each end of the environment 100 (e.g. the client device 102 and the server 104) the voice and/or data traffic requires packetization (usually done at the gateways 106) for transmission across the network 110. However, it should be appreciated that the FIG. 1 environment is only exemplary and that embodiments of the present invention can be used with any type of telecommunication system (e.g. circuit switched) and/or computer network (e.g. packet switched), protocols, and combinations thereof.

In one embodiment, the invention can be implemented in a client computing device 102. In an exemplary embodiment, the client device 102 generally includes, among other things, a processor, data storage devices such as non-volatile and volatile memory, and data communication components (e.g. antennas, modems, or other types of network interfaces etc.). Moreover, the client device 102 may also include display devices 111 (e.g. a liquid crystal display (LCD)) and an input component 112. The input component 112 may be a keypad, or, a screen that further includes input software to receive written information from a pen or another device. Attached to the client device 102 may be other Input/Output (I/O) devices 113 such as a mouse, a trackball, a pointing device, a modem, a printer, media cards (e.g. audio, video, graphics), network cards, peripheral controllers, a hard disk, a floppy drive, an optical digital storage device, a magneto-electrical storage device, Digital Video Disk (DVD), Compact Disk (CD), etc., or any combination thereof. Those skilled in the art will recognize any combination of the above components, are any number of different components, peripherals, and other devices, may be used with the client device 102, and that this discussion is for explanatory purposes only.

In continuing with the example of an exemplary client device 102, the client device 102 generally operates under the control of an operating system that is booted into the non-volatile memory of the client device for execution when the client device is powered-on or reset. In turn, the operating system controls the execution of one or more computer programs. These computer programs typically include application programs that aid the user in utilizing the client device 102. These application programs include, among other things, e-mail applications, dictation programs, word processing programs, applications for storing and retrieving addresses and phone numbers, applications for accessing databases (e.g. telephone directories, maps/directions, airline flight schedules etc.), and other application programs which the user of a client device 102 would find useful.

The exemplary client device 102 additionally includes a configuration selection switch 115, an audio capture module 120, analog to digital conversion functionality 122, feature extraction 124 and a small vocabulary/speech decoding function 126. The configuration selection switch 115 can be located within the client device 102. As will be discussed, the configuration selection switch 115, according to one embodiment of the invention, selects an architectural configuration based upon user functionality (e.g. the application and associated function being utilized by the user) and network conditions to implement speech recognition functions for the spoken dialogue system.

The audio capture module 120 captures incoming speech from a user of the client device 102. The audio capture module 120 connects to an analog speech input device (not shown), such as a microphone, to capture the incoming analog signal that is representative of the speech of the user. For example, the audio capture module 120 can be a memory device (e.g. an analog memory device).

The input analog signal representing the speech of the user, which is captured and stored by the audio capture module 120, is then digitized by analog to digital conversion functionality 122. An analog-to-digital (A/D) converter typically performs this function. The input analog speech signal is sampled by the analog-to-digital converter to create a digitized speech signal.

Feature extraction 124 is used to extract selected information from the digitized input speech signal to characterize the speech signal. Typically, for every 10–20 milliseconds of input digitized speech signal, the feature extractor converts the signal to a set of measurements of factors such as pitch, energy, envelope of the frequency spectrum, etc. By extracting these features the correct phonemes of the input speech signal can be more easily identified (and discriminated from one another) in the decoding process, to be discussed later. Feature extraction is basically a data-reduction technique to faithfully describe the salient properties of the input speech signal thereby cleaning up the speech signal and removing redundancies.

The small vocabulary/speech decoding function 126 utilizes the extracted features of the input speech signal to compare against a database of representative speech input signals. Generally, the speech decoding function 126 utilizes statistical pattern recognition and employs an acoustic model and a language model (for e.g., a context free grammar) to decode the extracted features of the input speech. The speech decoding function 126 searches through potential phonemes and words, word sequences, or sentences to choose the word, word sequence, or sentence that has the highest probability of re-creating the input speech used by the speaker. In this instance, for the client device 102, speech decoding 126 uses a small vocabulary. For example, small vocabularies are used for command and control applications that are used to direct the computer to perform specific tasks. An example of a command and control application would be to direct the client device 102 to look up an address of a business associate stored in the memory of the client device.

As shown in the exemplary environment 100, a server computer 104 is coupled to the client computing device through a link, or more particularly, a network 110. Typically the server computer 104 is a high-end server computer but can be any type of computer system that includes circuitry capable of processing data (e.g. a personal computer, workstation, minicomputer, mainframe, network computer, laptop, desktop, etc.). However, in this example, the server computer 104 typically includes speech recognition features to allow it to be part of a spoken dialogue system. Thus, in this example, the server computer 104 includes analog to digital conversion functionality 130, feature extraction 130, a large vocabulary/speech decoding function 134, and natural language processing 136. The functionality for the analog to digital conversion 130 and the feature extraction 132 have already been discussed with reference to the client device 102, operate in essentially the same way, and therefore will not be discussed for brevity's sake.

Furthermore, the large vocabulary speech decoding 134 operates in essentially the same way as previously discussed for the speech decoding 126 of the client device 102, but instead operates with a large vocabulary. Operating with a large vocabulary usually requires larger computing capabilities, but allows for more sophisticated speech recognition capabilities such as sophisticated natural language processing 136.

As shown in FIG. 1, the server computer 104 includes natural language processing 136 that operates in conjunction with the large vocabulary speech decoder 134. Utilizing the natural language processing 136, the server computer 104 can analyze the spoken words of the user to try and determine what the user wants and then perform the determined operation. For example, a user may ask the server computer 104 (via the client device 102) to book a flight from Boston to Portland and the server computer will determine that the user wants to make an airline reservation for a flight departing from Boston and arriving at Portland and the computer will then perform the transaction to make the reservation for the user.

According to one embodiment of the invention, the configuration selection switch 115, selects an architectural configuration based upon user functionality (e.g. the application and associated function being utilized by the user) and network conditions to implement speech recognition functions for the spoken dialogue system. For example, the configuration selection switch may select one of a client-based configuration, a server-based configuration, a client-server distributed configuration, or a client-gateway-server distributed configuration based upon user functionality and network conditions, as will be discussed in more detail. Each of these configurations is selected to provide the user with the most efficient speech recognition for the function being utilized by the user based upon network conditions. Thus, according to one embodiment, the invention unifies these various configurations in one system to make maximum use of their advantages.

Embodiments of the configuration selection switch 115 of the invention can be implemented in hardware, software, firmware, middleware or a combination thereof. In one embodiment, the configuration selection switch 115 can be generally implemented by the client computing device 102 as one or more instructions to perform the desired functions.

Figure 2:
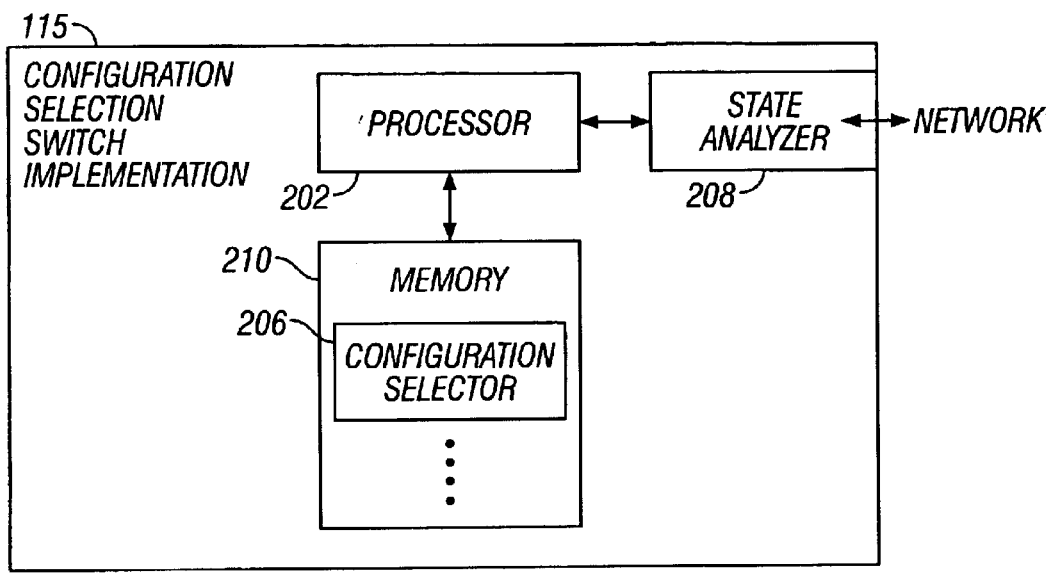
FIG. 2 is a block diagram of an exemplary implementation of a configuration selector switch according to one embodiment of the present invention.

FIG. 2 is a block diagram of an exemplary implementation of a configuration selector switch according to one embodiment of the present invention. In particular, in one embodiment of the invention, the configuration selection switch can be generally implemented in a client computing device having a processor 202. The processor 202 processes information in order to implement the functions of the configuration selection switch. As illustrative examples, the "processor" may include a digital signal processor, a microcontroller, a state machine, or even a central processing unit having any type of architecture, such as complex instruction set computers (CISC), reduced instruction set computers (RISC), very long instruction word (VLIW), or hybrid architecture. The processor 202 may be part of the overall client computing device or may be specific for the configuration selection switch. As shown, the processor 202 is coupled to a state analyzer 208 and memory 210. The memory 210 may be part of the overall client computing device or may be specific for the configuration selection switch. The memory 210 can be non-volatile or volatile memory, or any other type of memory, or any combination thereof. Examples of non-volatile memory include a hard disk, flash memory, battery-backed random access memory, Read-only-Memory (ROM) and the like whereas volatile memory includes random access memory (RAM), dynamic random access memory (DRAM) or static random access memory (SRAM), and the like.

The configuration selection switch can be implemented as one or more instructions (e.g. code segments), such as a configuration selector computer program 206, to perform the desired functions of selecting an architectural configuration based upon user functionality (e.g. the application and associated function being utilized by the user) and network conditions to implement speech recognition functions for the spoken dialogue system, as well as other functions described herein. Network conditions can be determined utilizing the state analyzer 208 that monitors the current state of network conditions (e.g. transmission bandwidth available, reliability, and cost). The instructions which when read and executed by a processor (e.g. processor 202), cause the processor to perform the operations necessary to implement and/or use embodiments of the invention. Generally, the instructions are tangibly embodied in and/or readable from a machine-readable medium, device, or carrier, such as memory, data storage devices, and/or a remote device contained within or coupled to the client computing device. The instructions may be loaded from memory, data storage devices, and/or remote devices into the memory 202 of the configuration selection switch for use during operations.

Those skilled in the art will recognize that the exemplary environments illustrated in FIG. 1 in 2 are not intended to limit the present invention. Indeed, those skilled in the art will recognize that other alternative system environments, client devices, and servers may be used without departing from the scope of the present invention. Furthermore, while aspects of the invention and various functional components have been described in particular embodiments, it should be appreciated these aspects and functionalities can be implemented in hardware, software, firmware, middleware or a combination thereof.

Various architectural configurations, methods, processes, procedures and/or algorithms will now be discussed to implement certain aspects of the invention.

Figure 3:
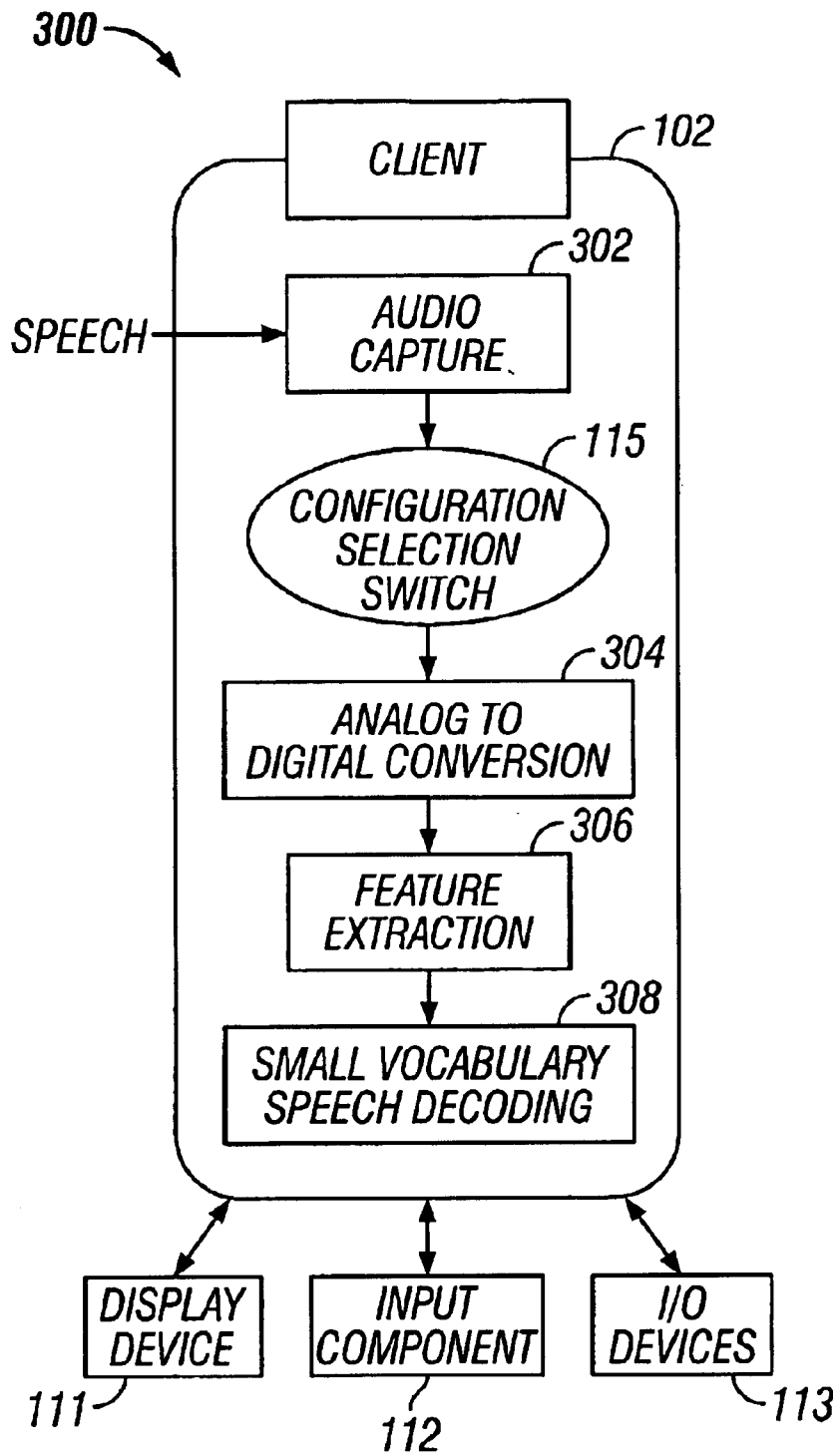
FIG. 3 is a block diagram illustrating a client-based configuration in which a client device performs speech recognition functions according to one embodiment of the present invention.

FIG. 3 is a block diagram illustrating a client-based configuration 300 in which the client device 102 performs speech recognition functions according to one embodiment of the present invention. Particularly, in the client-based configuration 300 the entire application resides on the client device 102.

The configuration selection switch 115, selects an architectural configuration based upon user functionality (e.g. the application and associated function being utilized by the user) and network conditions to implement speech recognition functions for the spoken dialogue system. The configuration selection switch 115 selects the client-based configuration 300 when the configuration selection switch determines that the application being utilized by the user is a small vocabulary application (e.g. command and control functionality) or that a network connection is not available, not reliable, or too expensive.

For example, small vocabulary applications are used for command and control functions that are used to direct the client device 102 to perform specific tasks wherein information that needs to be accessed is stored within the memory of client device. An example of this type of application would be an address/telephone book application. Utilizing a small vocabulary command and control function the user could, by speaking to the client device, direct the client device 102 to look up, for example, an address of a business associate stored in the memory of the client device.

Alternatively, the client device 102 may have application programs that are usually implemented by connecting to a server but that are also usable solely on the client device. For example, the client device 102 may have a word processing program that has dictation capabilities. In this embodiment, the client device 102 would have a large vocabulary speech decoding function module. Continuing with this example, the dictation portion may typically be performed at a high-end server with large computing capabilities for speed and accuracy, as opposed to the dictation being performed by the client device 102, which typically has smaller computing capabilities. However, if the configuration selection switch 115 determines that a network connection is not available, not reliable, or too expensive, then the configuration selection switch will select the client-based configuration 300 such that the client device 102 performs the speech recognition function for dictation.

Accordingly, when the configuration selection switch 115 selects the client-based configuration 300, an audio capture module 302 captures the incoming analog signal (transduced by, for example, a microphone) that is representative of the speech of the user. The input analog signal is then digitized by an analog to digital conversion function 304 (e.g. an A/D converter). Feature extraction 306 is then used to extract selected information from the digitized speech signal to characterize the signal such that the correct phonemes of the input speech signal can be more easily identified (and discriminated from one another) in the decoding process. Next, the speech decoding function 308 (small vocabulary or large vocabulary) searches through potential phonemes and words, word sequences or sentences to choose the word, word sequence or sentence that has the highest probability of re-creating the input speech used by the speaker. The recognized utterance can then be used by the application. For example, to look up the address of a business associate stored in the memory of the client device 102 in an address/telephone book application or to dictate the user's speech into a word processing application. The client-based configuration 300 advantageously provides high-quality audio-capture and network connection independence.

Figure 4:
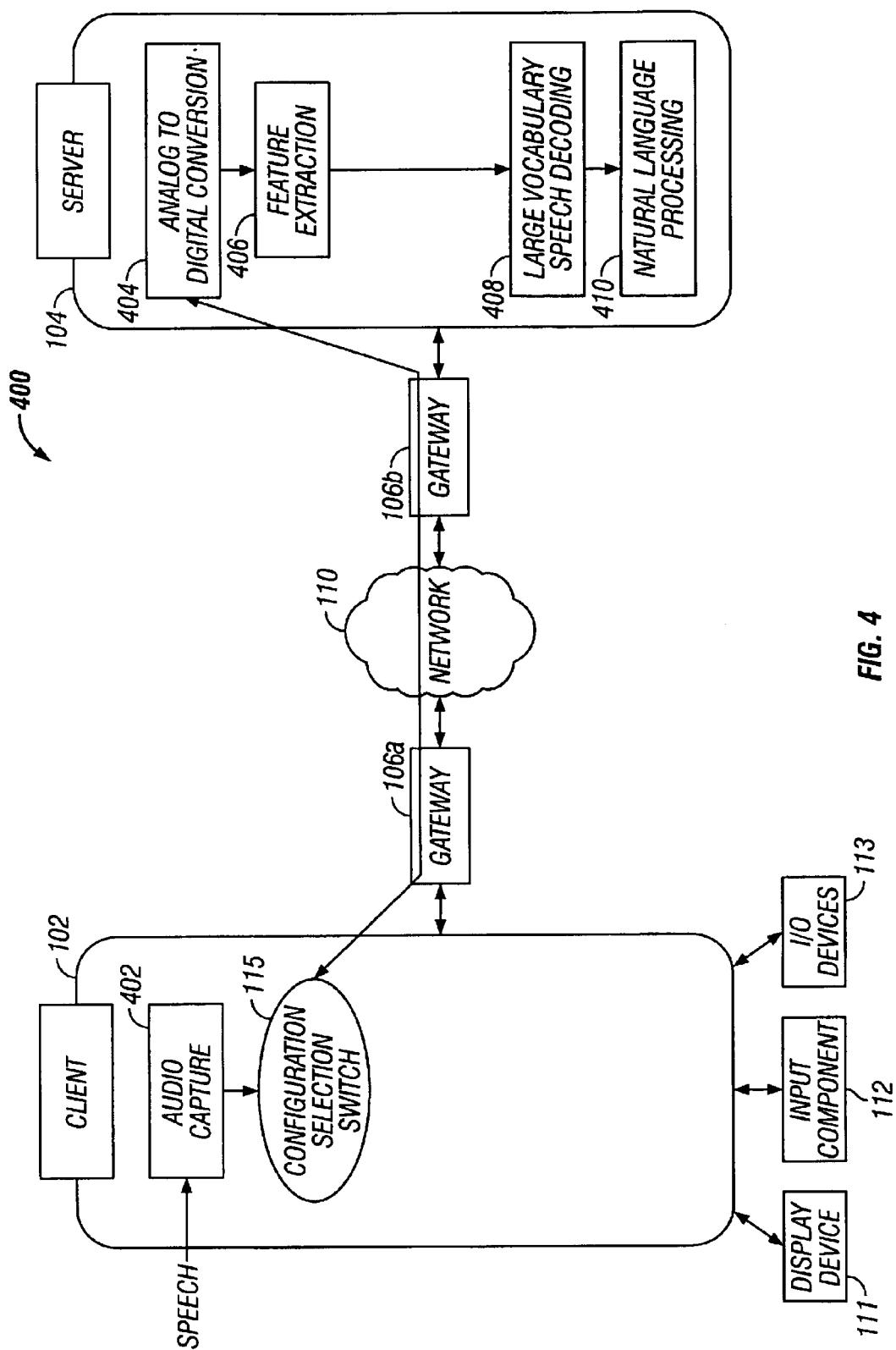
FIG. 4 is a block diagram illustrating a server-based configuration in which a server performs speech recognition functions according to one embodiment of the present invention.

FIG. 4 is a block diagram illustrating a server-based configuration 400 in which a server performs speech recognition functions according to one embodiment of the present invention. Particularly, in the server-based configuration 400, the entire application resides on the server 104 with the client device 102 taking care of analog audio capture.

The configuration selection switch 115, selects an architectural configuration based upon user functionality (e.g. the application and associated function being utilized by the user) and network conditions to implement speech recognition functions for the spoken dialogue system. The configuration selection switch 115 selects the server-based configuration 400 when the configuration selection switch determines that the application utilizes a large vocabulary and/or natural language based speech processing and a network connection is available with sufficient bandwidth for transmitting high-quality audio data.

For example, natural language processing applications, typically operating in conjunction with a large vocabulary, analyze the spoken words of a user to try and determine what the user wants and to then perform the determined operation. An example of this type of application would be an application to automatically make airline reservations based upon the voice request of the user utilizing the client device 102. Thus, a user may ask (via the client device 102) the server computer 104, which has an application to automatically make airline reservations, to book a flight from Boston to Portland. The server computer 104 will then determine that the user wants to make an airline reservation for a flight departing from Boston and arriving at Portland and the server computer will then perform the transaction to make the reservation for the user.

Accordingly, when the configuration selection switch 115 selects the server-based configuration 400, the audio capture module 402 captures and stores the incoming analog signal (transduced by, for example, a microphone) that is representative of the speech of the user. The client device 102 then transmits the analog speech signal to the server computer 104 via the link, or more particularly via gateways 106 and network 110. The input analog speech signal is then digitized by an analog to digital conversion function 404 (e.g. an A/D converter) of the server computer 104. Feature extraction 406 is then used to extract selected information from the digitized speech signal to characterize the signal such that the correct phonemes of the input speech signal can be more easily identified (and discriminated from one another) in the decoding process. Next, the speech decoding function 408 (e.g. large vocabulary speech decoding) searches through potential phonemes and words, word sequences or sentences to choose the word, word sequence or sentence that has the highest probability of re-creating the input speech used by the speaker. The recognized utterance can then be used by the application.

Continuing with the previous example, the server computer 104 having an application to automatically make airline reservations will determine that the user wants to make an airline reservation for a flight departing from Boston and arriving at Portland and the server computer 104 will then perform the transaction to make the reservation for the user utilizing natural language processing 410. The server-based configuration 400 advantageously provides the large computing capabilities to support large vocabulary speech applications with sophisticated natural language processing while the client device 102 takes care of analog audio capture.

Figure 5:
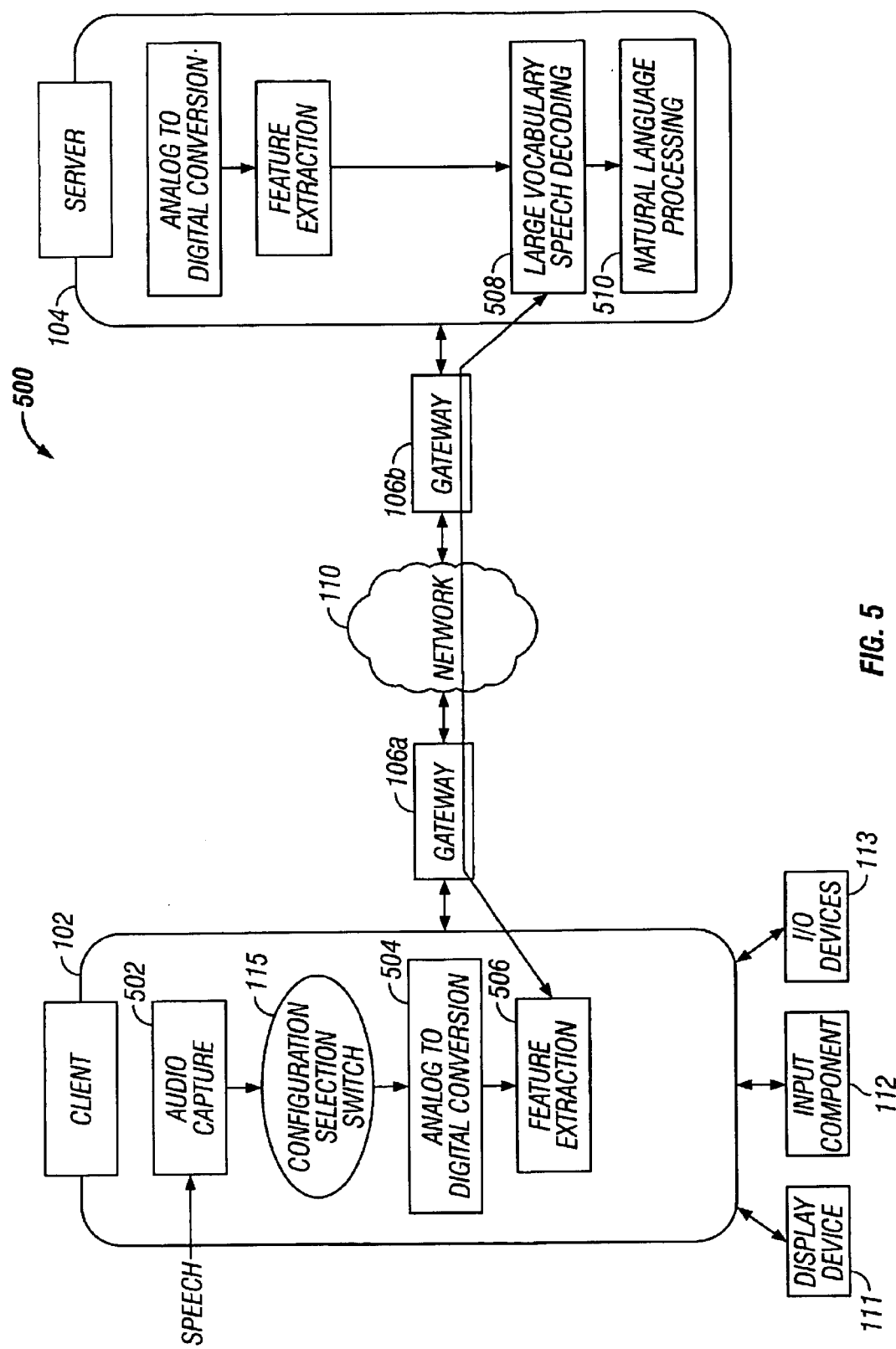
FIG. 5 is a block diagram illustrating a client-server distributed configuration in which both the client device and the server perform speech recognition functions according to one embodiment of the present invention.

FIG. 5 is a block diagram illustrating a client-server distributed configuration 500 in which both the client device 102 and the server 104 perform speech recognition functions according to one embodiment of the present invention. Particularly, in the client-server distributed configuration 500, the client device 102 handles audio capture, analog to digital conversion, and feature extraction, which require relatively low computing capabilities, while at the same time providing feature compression to parameterize the speech signal to reduce transmission bandwidth requirements. On the other hand, the server computer 104 handles the highly intensive computing components of the spoken dialogue system, namely, large vocabulary speech decoding and natural language processing.

The configuration selection switch 115, selects an architectural configuration based upon user functionality (e.g. the application and associated function being utilized by the user) and network conditions to implement speech recognition functions for the spoken dialogue system. The configuration selection switch 115 selects the client-server distributed configuration 500 when the configuration selection switch determines that the application utilizes a large vocabulary and/or natural language based speech processing and a network connection is available but with reduced transmission bandwidth.

For example, a large vocabulary application may be one where the client device 102 may have a word processing program without dictation capabilities (e.g. the client device has no decoding capabilities or only small vocabulary speech decoding). In which case, the dictation portion may typically be performed at a high-end server 104 having large vocabulary speech decoding, as previously discussed. An example of a natural language processing application may be an application to automatically make airline reservations based upon the voice request of the user utilizing the client device 102 in which the server computer 104 performs the transactions to make the airline reservation for the user, as previously discussed.

In any event, when the configuration selection switch 115 determines that a large vocabulary application and/or natural language processing application is being used and that the network connection has reduced bandwidth, the configuration selection switch selects the client-server distributed configuration 500. As shown in FIG. 5 the audio capture module 502 captures and stores the incoming analog speech signal (transduced by, for example, a microphone) that is representative of the speech of the user. The client device 102 then digitizes the input analog speech signal by an analog to digital conversion function 504 (e.g. an A/D converter). The client device 102 then performs feature extraction 506 which is used to extract selected information from the digitized speech signal to characterize the signal such that the correct phonemes of the input speech signal can be more easily identified (and discriminated from one another) in the decoding process. Further, the client device 102, in some embodiments, performs feature compression to parameterize the speech signal to reduce transmission bandwidth requirements. Lastly, the client device 102 transmits the digitized feature extracted, and possibly compressed, speech signal to the server computer 104 via the link, or more particularly via gateways 106 and network 110.

Next, the server computer 104 performs the speech decoding function 508 (e.g. large vocabulary speech decoding) by searching through potential phonemes and words, word sequences or sentences to choose the word, word sequence or sentence that has the highest probability of re-creating the input speech used by the speaker. The recognized utterance can then be used by the application. In the case of previously discussed airline reservation application example, the server computer 104 utilizing natural language processing 510 will determine that the user wants to make an airline reservation for a flight departing from Boston and arriving at Portland and the server computer 104 will then perform the transaction to make the reservation for the user. In the case of the example where the client device 102 has a word processing program without dictation capabilities, and in which the dictation portion is performed at the server computer 104, the server computer performs the dictation function for the client device and transmits the dictation back to the client device for use by the word processor. Thus, the client-server distributed configuration 500 combines the advantage of high-quality audio capture by the client device with the sophisticated large vocabulary and natural language processing based speech applications supported by the server computer 104, while maintaining low transmission bandwidth requirements.

Figure 6:
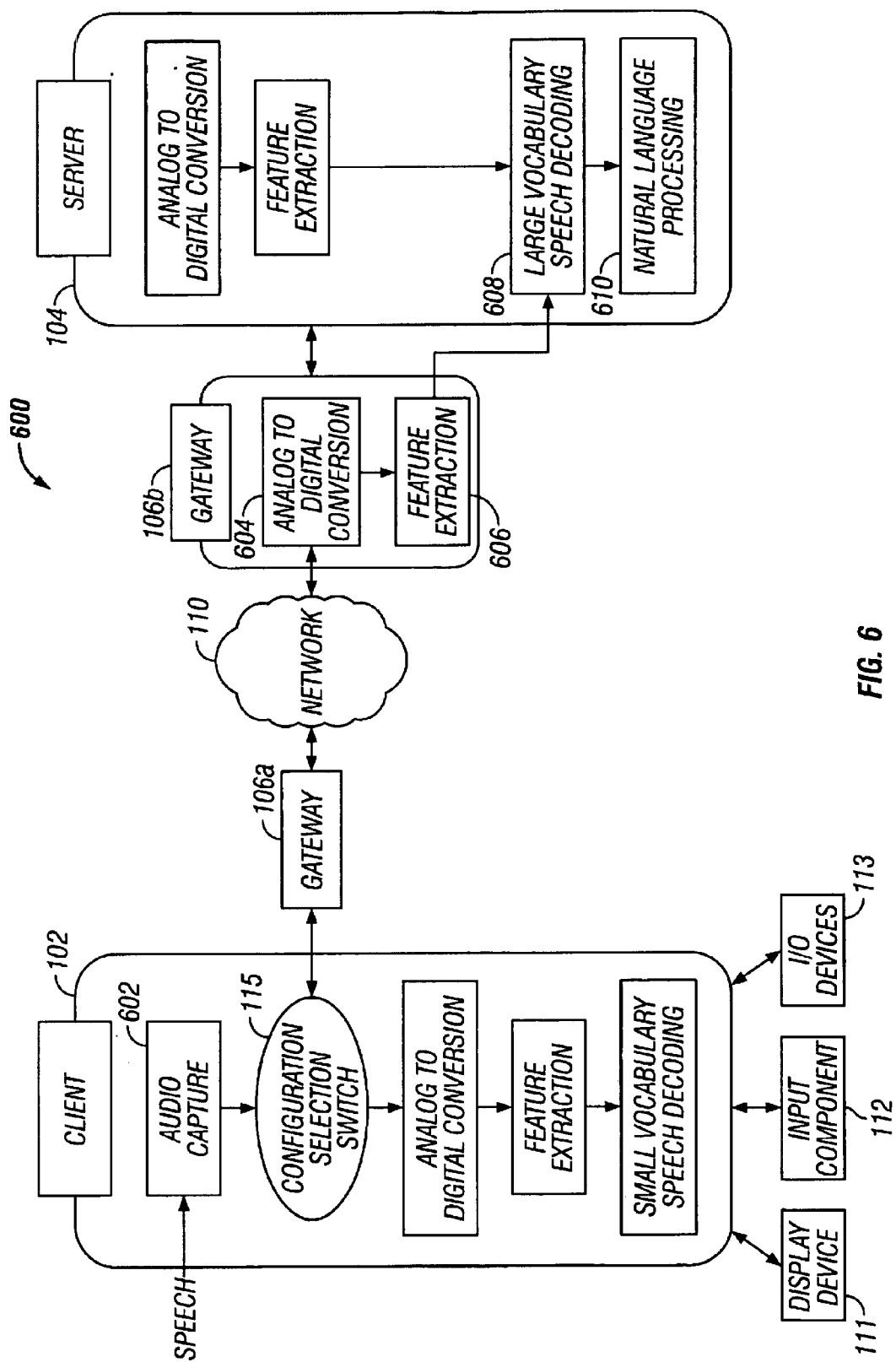
FIG. 6 is a block diagram illustrating a client-gateway-server distributed configuration in which the gateway and server perform speech recognition functions according to one embodiment of the present invention.

FIG. 6 is a block diagram illustrating a client-gateway-server distributed configuration 600 in which the gateway 106b and server 104 perform speech recognition functions according to one embodiment of the present invention. Particularly, in the client-gateway-server distributed configuration 600, the client device 102 handles audio capture and an intermediate gateway 106b (utilizing, for example, a Dialogic card) performs analog to digital conversion and feature extraction. The intermediate gateway 106b then transmits the digitized feature extracted speech signal to the server 104 for decoding. The configuration selection switch 115 may choose this configuration when the client device 102 is not a smart client (i.e. not enabled with computing capability, as is the case in many currently available cell-phones), and reduced bandwidth to the server is desired. This is often desired in order to accommodate more users communicating with the same server simultaneously to reduce the system costs of the service providers.

The configuration selection switch 115, selects an architectural configuration based upon user functionality (e.g. the application and associated function being utilized by the user) and network conditions to implement speech recognition functions for the spoken dialogue system. The configuration selection switch 115 selects the client-gateway-server distributed configuration 600 when the configuration selection switch determines that the client device 102 is not a smart client (i.e. not enabled with computing capability, as is the case in many currently available cell-phones), and reduced bandwidth to the server is desired.

Continuing with one the previous examples, the user of the client device 102 may want to make an airline reservation from Boston to Portland. In order to accomplish this, the server computer 104 typically has a large vocabulary application and a natural language processing application to analyze the spoken words of the user to try and determine what the user wants and to then perform the determined operation. Thus, in this particular instance, the server computer 104 automatically performs the transaction to make an airline reservation for the user based upon the voice request of the user utilizing the client device 102.

In any event, when the configuration selection switch 115 determines that the client device 102 is not a smart client (i.e. not enabled with computing capability) and reduced bandwidth to the server is desired, the configuration selection switch selects the client-gateway-server distributed configuration 600. As shown in FIG. 6, the audio capture module 602 captures and stores the incoming analog speech signal (transduced by, for example, a microphone) that is representative of the speech of the user. The client device 102 transmits the analog speech signal through the network 110 to the gateway 106b (which utilizes, for example, a Dialogic card). The gateway 106b then digitizes the input analog speech signal by an analog to digital conversion function 604 (e.g. an A/D converter). The gateway 106b then performs feature extraction 606 which is used to extract selected information from the digitized speech signal to characterize the signal such that the correct phonemes of the input speech signal can be more easily identified (and discriminated from one another) in the decoding process. Lastly, the gateway 106b transmits the digitized feature extracted speech signal to the server computer 104.

Next, the server computer 104 performs the speech decoding function 608 (e.g. large vocabulary speech decoding) by searching through potential phonemes and words, word sequences or sentences to choose the word, word sequence or sentence that has the highest probability of re-creating the input speech used by the speaker. The recognized utterance can then be used by the application. In the case of previously discussed airline reservation application example, the server computer 104 utilizing natural language processing 610 will determine that the user wants to make an airline reservation for a flight departing from Boston and arriving at Portland and the server computer 104 will then perform the transaction to make the reservation for the user. Thus, the client-gateway-server distributed configuration 600 advantageously provides large vocabulary and natural language based speech processing applications for client devices without computing capabilities, but with reduced bandwidth to the server, in order to accommodate more users communicating with the same server simultaneously to reduce the system costs of the service providers.

Figure 7:
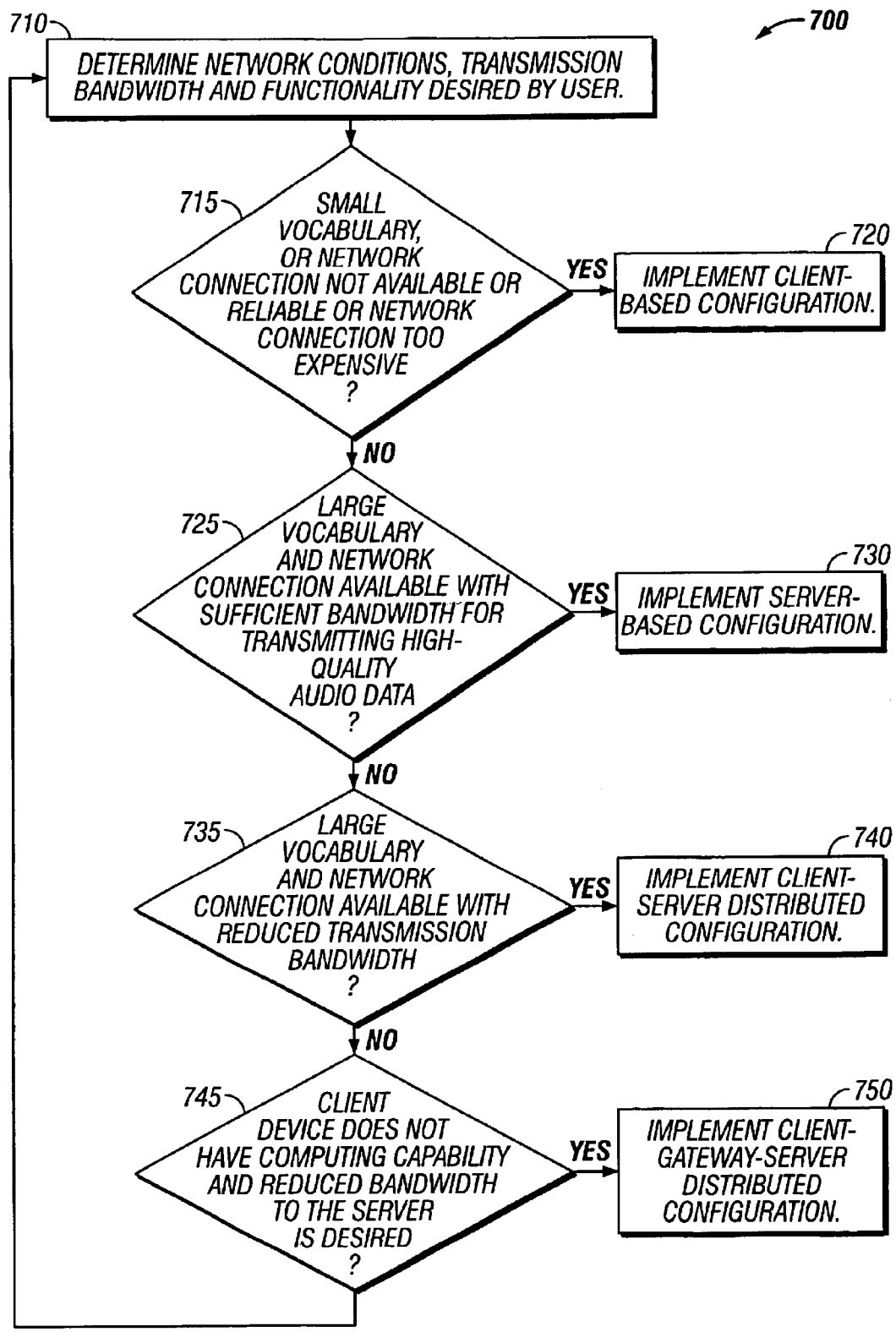
FIG. 7 is a flowchart illustrating a process for selecting a configuration for the spoken dialogue system according to one embodiment of the present invention.

FIG. 7 is a flowchart illustrating a process 700 for selecting a configuration for the spoken dialogue system according to one embodiment of the present invention. At block 710, the process 700 continuously determines network conditions, transmission bandwidth, and the functionality desired by the user (e.g. the type of application and associated function being utilized by the user).

At block 715, the process 700 determines whether a small vocabulary function is being utilized or whether a network connection is not available, not reliable, or too expensive. If any of these conditions are met, the process 700 implements the client-based configuration (block 720). If not, the process 700 proceeds to block 725.

At block 725, the process 700 determines whether a large vocabulary function is being utilized and whether a network connection is available with sufficient bandwidth for transmitting high-quality audio data. If so, the process 700 implements the server-based configuration (block 730). If not, the process 700 proceeds to block 735.

At block 735, the process 700 determines whether a large vocabulary function is being utilized and whether a network connection is available but having reduced transmission bandwidth. If so, the process 700 implements the client-server distributed configuration (block 740). If not, the process 700 proceeds to block 745.

At block 745, the process 700 determines whether a client device has computing capabilities and whether reduced bandwidth to the server is desired. If the client device does not have computing capabilities and reduced bandwidth to the server is desired, the process 700 implements the client-gateway-server distributed configuration (block 750). If not, the process 700 starts over at block 710. Even after a particular configuration is selected, the process 700 still continuously determines network conditions, transmission bandwidth, and the functionality desired by the user (e.g. the type of application and associated function (e.g. small or large vocabulary) being utilized by the user), to continuously implement the optimal configuration.

Thus, the embodiments of the invention select one of a client-based configuration, a server-based configuration, a client-server distributed configuration, or a client-gateway-server distributed configuration based upon user functionality and network conditions. Each of these configurations is selected to provide the user with the most efficient speech recognition for the function being utilized by the user based upon network conditions. This results in a spoken dialogue system that makes the best use of available resources and provides a better user experience due to the range and availability of applications that can be automatically and efficiently accessed for the user by the configurations of the invention. Thus, according to one embodiment, the invention unifies these various configurations in one system to make maximum use of their advantages. Moreover, the embodiments of the invention can be incorporated into any spoken dialogue system and provide different types of functionality ranging from command-and-control to the more complex natural language based applications. Use of the invention will result not only in significant improvements in recognition accuracy but also in a better user experience due to the range and availability of the applications supported by the configurations.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In particular, in one embodiment of the present invention, the configuration selection switch can be generally implemented in a client device, to perform the desired operations, functions, and processes as previously described. The instructions (e.g. code segments) when read and executed by the configuration selection switch and/or client device, cause the configuration selection switch and/or client device to perform the operations necessary to implement and/or use the present invention. Generally, the instructions are tangibly embodied in and/or readable from a device, carrier, or media, such as memory, data storage devices, and/or a remote device contained within or coupled to the client device. The instructions may be loaded from memory, data storage devices, and/or remote devices into the memory of the configuration selection switch and/or client device for use during operations.

Thus, the configuration selection switch according to one embodiment of the present invention may be implemented as a method, apparatus, or machine-readable medium (e.g. a processor readable medium or a computer readable medium) using standard programming and/or engineering techniques to produce software, firmware, hardware, middleware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus for connection to a server over a network, the apparatus comprising:
   a client device to be coupled to the server through the network; and
   a configuration selection switch to select a configuration based upon user functionality and network conditions to implement speech recognition functions for a spoken dialogue system.

2. The apparatus of claim 1, wherein if user functionality includes utilizing a small vocabulary, the configuration selection switch to select a client-based configuration.

3. The apparatus of claim 1, wherein if network conditions are such that a network connection is not available or not reliable, the configuration selection switch to select a client-based configuration.

4. The apparatus of claim 3, wherein in the client-based configuration, the client device performs speech recognition functions.

5. The apparatus of claim 1, wherein if user functionality includes utilizing a large vocabulary and a network connection is available with sufficient bandwidth for transmitting audio data, the configuration selection switch to select a server-based configuration.

6. The apparatus of claim 5, wherein in the server-based configuration, the server performs speech recognition functions.

7. The apparatus of claim 1, wherein if user functionality includes utilizing a large vocabulary and a network connection is available having reduced bandwidth for transmitting audio data, the configuration selection switch to select a client-server distributed configuration.

8. The apparatus of claim 7, wherein in the client-server distributed configuration, the client device performs the speech recognition functions of analog to digital conversion and feature extraction and the server performs the speech recognition functions of decoding and language processing.

9. The apparatus of claim 1, wherein if the client device does not have computing capabilities and reduced bandwidth to the server for transmitting audio data is desired, the configuration selection switch to select a client-gateway-server distributed configuration.

10. The apparatus of claim 9, wherein in the client-gateway-server distributed configuration, a gateway performs the speech recognition functions of analog to digital conversion and feature extraction and the server performs the speech recognition functions of decoding and language processing.

11. A method comprising:
    determining user functionality and network conditions in a spoken dialogue system; and
    selecting a configuration for the spoken dialogue system based upon user functionality and network conditions to implement speech recognition functions.

12. The method of claim 11, wherein if user functionality is determined to include utilizing a small vocabulary, a client-based configuration is selected.

13. The method of claim 11, wherein if network conditions are determined to indicate that a network connection is not available or not reliable, a client-based configuration is selected.

14. The method of claim 13, wherein in the client-based configuration, a client device performs speech recognition functions.

15. The method of claim 11, wherein if user functionality is determined to include utilizing a large vocabulary and network conditions are determined to include a network connection that is available with sufficient bandwidth for transmitting audio data, a server-based configuration is selected.

16. The method of claim 15, wherein in the server-based configuration, a server performs speech recognition functions.

17. The method of claim 11, wherein if user functionality is determined to include utilizing a large vocabulary and network conditions are determined to include a network connection that is available having reduced bandwidth for transmitting audio data, a client-server distributed configuration is selected.

18. The method of claim 17, wherein in the client-server distributed configuration, a client device performs the speech recognition functions of analog to digital conversion and feature extraction and a server performs the speech recognition functions of decoding and language processing.

19. The method of claim 11, wherein if a client device does not have computing capabilities and reduced bandwidth to a server for transmitting audio data is desired, a client-gateway-server distributed configuration is selected.

20. The method of claim 19, wherein in the client-gateway-server distributed configuration, a gateway performs the speech recognition functions of analog to digital conversion and feature extraction and the server performs the speech recognition functions of decoding and language processing.

21. A machine-readable medium having stored thereon instructions, which when executed by a machine, cause the machine to perform the following:

determining user functionality and network conditions in a spoken dialogue system; and selecting a configuration for the spoken dialogue system based upon user functionality and network conditions to implement speech recognition functions.

22. The machine-readable medium of claim 21, wherein if user functionality is determined to include utilizing a small vocabulary, a client-based configuration is selected.

23. The machine-readable medium of claim 21, wherein if network conditions are determined to indicate that a network connection is not available or not reliable, a client-based configuration is selected.

24. The machine-readable medium of claim 23, wherein in the client-based configuration, a client device performs speech recognition functions.

25. The machine-readable medium of claim 21, wherein if user functionality is determined to include utilizing a large vocabulary and network conditions are determined to include a network connection that is available with sufficient bandwidth for transmitting audio data, a server-based configuration is selected.

26. The machine-readable medium of claim 25, wherein in the server-based configuration, a server performs speech recognition functions.

27. The machine-readable medium of claim 21, wherein if user functionality is determined to include utilizing a large vocabulary and network conditions are determined to include a network connection that is available having reduced bandwidth for transmitting audio data, a client-server distributed configuration is selected.

28. The machine-readable medium of claim 21, wherein in the client-server distributed configuration, a client device performs the speech recognition functions of analog to digital conversion and feature extraction and a server performs the speech recognition functions of decoding and language processing.

29. An apparatus comprising:

means for determining user functionality and network conditions in a spoken dialogue system; and means for selecting a configuration for the spoken dialogue system based upon user functionality and network conditions to implement speech recognition functions.

30. The apparatus of claim 29, wherein if user functionality is determined to include utilizing a small vocabulary, a client-based configuration is selected.

31. The apparatus of claim 29, wherein if user functionality is determined to include utilizing a large vocabulary and network conditions are determined to include a network connection that is available having reduced bandwidth for transmitting audio data, a client-server distributed configuration is selected.

* * * * *